(12) United States Patent
Dove

(10) Patent No.: US 7,862,285 B1
(45) Date of Patent: Jan. 4, 2011

(54) COMPRESSOR TROLLEY

(76) Inventor: Michael J Dove, 590 Upper Hembree Rd., Rosewell, GA (US) 30076

( * ) Notice: Subject to any disclaimer, the term of this patent is extended or adjusted under 35 U.S.C. 154(b) by 1103 days.

(21) Appl. No.: 11/358,258

(22) Filed: Feb. 21, 2006

(51) Int. Cl.
*B60P 3/40* (2006.01)

(52) U.S. Cl. .................... 414/281; 414/458; 254/85; 254/425

(58) Field of Classification Search ............ 254/13, 254/84, 85, 424, 425; 414/281, 458
See application file for complete search history.

(56) References Cited

U.S. PATENT DOCUMENTS

| | | | | |
|---|---|---|---|---|
| 1,332,599 | A * | 3/1920 | Bradford | 269/17 |
| 1,709,153 | A | 4/1929 | Pownall | |
| 1,933,211 | A | 10/1933 | Flowers | |
| 3,323,777 | A * | 6/1967 | McMullen | 254/103 |
| 3,486,650 | A * | 12/1969 | Boone | 414/458 |
| 3,631,999 | A * | 1/1972 | Walerowski | 414/458 |
| 3,794,196 | A | 2/1974 | Terho et al. | |
| 3,977,542 | A * | 8/1976 | Stolzer | 414/331.11 |
| 4,041,875 | A | 8/1977 | Wallace | |
| 4,227,464 | A | 10/1980 | Wallace | |
| 4,446,587 | A | 5/1984 | Jump | |
| 4,459,732 | A * | 7/1984 | Driggers | 29/426.3 |
| 4,567,709 | A * | 2/1986 | Faw | 52/745.14 |
| 4,611,816 | A * | 9/1986 | Traister et al. | 280/43.2 |
| 4,763,800 | A | 8/1988 | Engler et al. | |
| 4,865,293 | A * | 9/1989 | Ishi et al. | 254/2 R |
| 5,127,740 | A * | 7/1992 | DeBoer | 366/2 |
| 5,348,172 | A | 9/1994 | Wilson | |
| 5,791,856 | A * | 8/1998 | Kosonen et al. | 414/458 |
| 6,149,120 | A | 11/2000 | Hall | |
| 6,273,662 | B1 | 8/2001 | Fleckenstein | |
| 2003/0180132 | A1 * | 9/2003 | Morreim | 414/458 |

FOREIGN PATENT DOCUMENTS

| | | |
|---|---|---|
| GB | 657.946 | 9/1951 |
| GB | 2.112.737 | 7/1983 |

* cited by examiner

*Primary Examiner*—Saúl J Rodríguez
*Assistant Examiner*—Jonathan D Snelting
(74) *Attorney, Agent, or Firm*—Michael I. Kroll

(57) ABSTRACT

Disclosed is a hoist trolley having a pair of jacking plates with apertures for attaching the plates to a compressor. Fixed to the opposing ends of the jack-plates are telescopic legs with extendable retractable wheels and a screw jack that is used to elevate the load, once the plates are attached, enabling the wheels to be extended. Once extended, the jack base plate is raised with the wheels supporting the load. Transporting the load is accomplished by providing a pair of rails cantilevered from a stand. Also provides are additional elements to enhance the range of applications for the compressor trolley including a pry bar incorporating a motive member whereby the bar can be used in the similar function of supporting some part of the load while moving to a workspace and a depending pivot arm having one element of a fastener, with the other incorporated into an opposing jacking plate. Furthermore, the spaced apart trolley rails can include integral rollers.

7 Claims, 18 Drawing Sheets

COMPRESSOR TROLLEY

BACKGROUND OF THE INVENTION

1. Field of the Invention

The present invention relates generally to hoists and, more specifically, to a hoist trolley having means for elevating a load and means for transporting the load. Means for elevating the load comprises a pair of jacking plates having apertures passing through it providing means for attaching the plates to the load. Fixed to the opposing ends of the jack-plates are telescopic legs with extendable retractable wheels. In addition, the jacking element is incorporated therein comprising a screw jack that is used to elevate the load, once the plates are attached, enabling the wheels to be extended. Once extended, the jack base plate is raised with the wheels supporting the load. Transporting the load is accomplished by providing a pair of rails cantilevered from a stand.

The present invention also provides for additional elements to enhance the range of applications for the compressor trolley. Depicted within the illustrations is a pry bar incorporating a motive member whereby the bar can be used in the similar function of supporting some part of the load while moving to a workspace. Another illustration depicts a depending pivot arm having one element of a fastening means, with the other incorporated into an opposing jacking plate. Furthermore, the spaced apart trolley rails can include rollers spaced therebetween.

In operation, the rails are placed on each side of the load, in the preferred embodiment the hoist trolley is used to move one or more compressors from a refrigeration rack for maintenance or replacement. In this scenario, mounted compressors have bolt flanges that are spaced higher than the bottom of the compressor, about a quarter of an inch, enabling the base of the rails, which have a substantially L-shape in cross section, to be inserted under the bolt flanges and fastened to some structural support, the point being to prevent the rails from splaying especially under load. Jacking plates are then bolted to the compressor with the wheels suspended over the rails. Once fastened the screw jacks are employed to raise the compressor enough so that the wheels when lowered engage the rails and support the compressor.

It should be noted that the physical space needed to deploy the hoist trolley is not much more than the actual space taken up by the compressor. In some instances, a control panel is situated directly above the compressor(s) making it impossible or difficult to employ the prior art devices, such as comealong (Ratchet lever hoist), chain fall (Chain Hoist) and gantry crane. With the present invention the load need be raised no more than a few inches to drop the wheels down and moved along the rails to a point where maintenance can be more easily performed.

If it is necessary to replace the compressor, a frame and chain fall are provided as an additional element of the present invention. The rail-stand legs serve as sleeves to mount the chain fall frame providing means for dropping the defunct compressor and raising its replacement onto the rails. Installing or reinstalling a compress involves reversing the aforementioned process.

2. Description of the Prior Art

There are other jacking devices designed for load bearing. Typical of these is U.S. Pat. No. 1,709,153 issued to Pownall on Apr. 16, 1929.

Another patent was issued to Flowers on Oct. 31, 1933 as U.S. Pat. No. 1,933,211. Yet another U.S. Pat. No. 3,794,196 was issued to Terho et al. on Feb. 26, 1974 and still yet another was issued on Aug. 16, 1977 to Wallace as U.S. Pat. No. 4,041,875.

Another patent was issued to Wallace on Oct. 14, 1980 as U.S. Pat. No. 4,227,464. Yet another U.S. Pat. No. 4,446,587 was issued to Jump on May 8, 1984. Another was issued to Engler et al. on Aug. 16, 1988 as U.S. Pat. No. 4,763,800 and still yet another was issued on Sep. 20, 1994 to Wilson as U.S. Pat. No. 5,384,172.

Another patent was issued to Hall on Nov. 21, 2000 as U.S. Pat. No. 6,149,120. Yet another U.S. Pat. No. 6,273,662 was issued to Fleckenstein on Aug. 14, 2001. Another was issued to Fabriks Aktiebolaget Forslund on Sep. 26, 1951 as U.K. Patent No. GB657,946 and still yet another was issued on Jul. 27, 1983 to Penny as U.K. Patent No. GB2112737.

U.S. Pat. No. 1,709,153

Inventor: Henry D. Pownall

Issued: Apr. 16, 1929

In a fracture bed and the like, an adjustably supported sling including a band, a plurality of supporting links secured to each of opposite edges of the band, cross bars connecting opposite links, a rod connecting the cross bars, a yoke slidably supporting the rod, and means for adjusting the position of the yoke on the rod.

U.S. Pat. No. 1,933,211

Inventor: Henry Fort Flowers

Issued: Oct. 31, 1933

In a vehicle for transporting a plurality of containers, a source of power, a plurality of means actuated by said source for moving said containers, at least one of said actuated means being located between two of said containers, and devices for connecting a plurality of said actuated means to a selected one of said containers at points thereof spaced at right angles to the direction of sliding movement to be given the container and operating for sliding the container to and from its transport position on said vehicle when said source of power is energized, the device associated with said one actuating means being selectively engageable with either of the adjacent containers.

U.S. Pat. No. 3,794,196

Inventor: Matti Terho et al.

Issued: Feb. 26, 1974

A carrier for the loading and unloading of elongated freight containers includes a U-shaped body consisting of beams forming an inner space corresponding to the size of the container, and hydraulic means gripping and lifting the container. The U-shaped body has four wheels at its corners with hydraulic motors and steering means, an engine and a hydraulic pump driven by the engine and operatively connected with the hydraulic wheel motors, the steering means and the hydraulic gripping and lifting means. The operative connections of the pump include control means.

U.S. Pat. No. 4,041,875

Inventor: Bernard E. Wallace

Issued: Aug. 16, 1977

A load-handling gantry having a single, unitary, bridging beam, and leg, brace and mounting components supporting the beam with provision for adjustment of gantry span, height, and spread, while maintaining gantry mobility. The mounting components are adjustable to enable use of the gantry in a number of configurations including inboard, outboard, and combination leg bracing, and with freedom for use under cantilever conditions. In the preferred embodiment, a predetermined camber, or longitudinal splay angle, of the plane of each pair of legs is provided, to decrease movement between the gantry legs and the beam, in the direction lengthwise of the beam, when the gantry is under load, thereby stabilizing the gantry in that sense. The selected splay angle is maintained by apparatus which couples the leg bracing struts to the beam and to the legs. Any selected angle, under the various arrangements of leg bracing, may be had, and may be maintained, by such coupling apparatus, which provides alteration of the effective bracing strut length, without the necessity of actually substituting struts of different lengths. Lateral clearance between the beam, and the legs and bracing struts, is maintained in the various configurations, at a value such as to permit free movement of the leg and strut assemblies along the length of the beam, and also a measure of lateral flexibility of the gantry. All adjustments relative to the beam may be made through external frictional gripping apparatus, cooperable with a standard imperforate beam.

U.S. Pat. No. 4,227,464

Inventor: Bernard E. Wallace

Issued: Oct. 14, 1980

Leg structure for portable, height-adjustable gantries is disclosed having an upper, single vertical tubular post member telescopingly received within an open-ended sleeve formed by coupled aligned channel members of lower, break-apart sectional supporting framework. The channel members are supported and elevated by diagonal bracing members and struts giving a generally inverted-Y shaped configuration to the leg so that it can straddle objects and permitting the free, unobstructed downward passage of the post through the lower opening of the sleeve. A locking bolt passes through aligned holes in the post and channels to selectively hold their relative positions, with hand-operated winch means aiding the movement of the post. Post extension members are disclosed which can be added to the leg post while the gantry is assembled. The plate connection between the top of the post and a load-supporting I-beam is externally and internally braced by triangles and post weldment or casting insert elements, respectively. Alternative embodiments show plate and tubular spacer channel coupling arrangements, and solid post-to-frame and non-breakdown frame leg configurations.

U.S. Pat. No. 4,446,587

Inventor: Clarence E. Jump

Issued: May 8, 1984

A patient positioning device characterized by a horizontal support beam, a pair of motors coupled to the support beam, a first cable and hook assembly associated with a first motor, a second cable and hook assembly associated with a second motor, and a motor controller operative to selectively actuate the first motor, the second motor, or both motors simultaneously. Rigid, body contoured supports and/or flexible slings are coupled to one or both of the motors to selectively lift portions of a patient's body from a bed.

U.S. Pat. No. 4,763,800

Inventor: Edgar D. Engler

Issued: Aug. 16, 1988

A mobile lifting apparatus has a chassis with front driving wheels and steerable rear wheels. A vertical mast comprised of a pair of extendible hydraulic cylinders is spacedly mounted on the front of the chassis. One or more jam stay cylinders are mounted on the chassis rearwardly of the vertical mast. A pair of extendable booms are mounted on the vertical mast and jam stay cylinders. The load may be attached to the end of the booms. A hydraulic or other power supply extends and retracts the boom and drives the driving wheels. A counterweight is mounted on the rear of the chassis and the chassis may be extended to increase the capacity and stability of the lifting apparatus.

U.S. Pat. No. 5,348,172

Inventor: Frederick F. K. Wilson

Issued: Sep. 20, 1994

A mobile crane has a triangular wheel arrangement with a steerable front wheel and a frame for carrying an operator and a boom which is adjustable both as to vertical angle and azimuth. Shock absorbing stabilizing arm assemblies extend from either side of the frame, and an adjustable counterweight assembly is pivotally mounted at the rear of the frame, and can be adjusted to its optimum position, depending on the load, by the operator without his having to exert any lifting effort. The crane boom is likewise adjustable as to azimuth and elevation angle without the operator's having to move any heavy weight.

U.S. Pat. No. 6,149,120

Inventor: Donald M. Hall

Issued: Nov. 21, 2000

This invention pertains to a device having a first and second upright, a support rail connecting the first upright and the second upright, and a vertical spacer having a first edge, a second edge and a bearing surface. A portion of the first edge is disposed on the first upright and a portion of the first edge is disposed on the second upright. A guide rail having a top surface is disposed along the second edge of the vertical spacer. The guide rail extends over the bearing surface. The device further includes a sliding support member having a first roller, a second roller and a third roller. The first roller engages the top surface of the guide rail and is oriented for transmitting substantially only vertical forces from the sliding support member to the top surface. The second roller engages the support rail and is oriented for transmitting substantially only horizontal forces from the sliding support member to the support rail. The third roller is disposed beneath the top surface of the guide rail and the first roller, and engages the bearing surface of the vertical spacer. The third roller is oriented for transmitting substantially only horizontal forces from the sliding support member to the bearing surface section.

U.S. Pat. No. 6,273,662

Inventor: Mark A. Fleckenstein

Issued: Aug. 14, 2001

The invention is directed to a lifting device that can be used to lift, support and align articles such as cabinets, counter tops, shelving and the like during installation and removal. The lifting device includes a base, a hydraulic ram assembly, an adjustable L-shaped bracket assembly and an adjustable platform. The lifting device has a height adjustable range from thirteen inches to eight feet and is adapted to allow the load to be positioned directly over the lift or offset if an extended outward reach is needed. The adjustable platform is designed to allow the lifted article to be pivoted in multiple axes of rotation thereby allowing precision alignment of the cabinet with respect to the wall to which it is to be secured prior to installation.

U.K. Patent Number GB657,946

Inventor: Fabriks Artiebolaget Forslund & Co.

Issued: Sep. 26, 1951

A hydraulic crane for motor vehicles has a cantilever arm for carrying a load and swinging both in a horizontal and a vertical direction, and a hydraulic device comprising a pressure cylinder and a piston for the movement of said arm in a vertical direction, characterized in that said arm is hinged to a bracket for up and down movement in a vertical plane, said bracket being firmly secured to said cylinder, and that said cylinder is supported to turn about its axis. As shown in FIG. 1, a tubular pedestal 1 secured to a plate 2 on the frame of a motor lorry receives an extension 3 of a hydraulic cylinder 4 rotatably mounted by means of a collar 5 on a collar 6 secured to the pedestal 1. The cylinder 4 carries a bracket 7 shaped to extend over the driver's cab and providing a pivot for a jib 8. The jib 8 is connected by a link 10 to a piston 9 working in the cylinder 4 and serving to luff the jib. The jib 8 comprises a pair of spaced vertical plates or is tubular or U-shaped in section to provide for the mounting of pulleys 14 and 15. A hoisting rope 13 passes from a load hook 12 over the pulleys 14, 15 and a pulley 16 on the cylinder 4 to an anchorage 17 on the jib. For sluing pressure liquid is admitted through conduits 20, 21 (FIG. 2) to a part-cylindrical housing 18 in which works a vane 19 secured to the projection 3 of the cylinder 4 and dividing the housing 18 into two chambers.

U.K. Patent Number GB2112737

Inventor: John Summers Penny

Issued: Jul. 27, 1983

A van type vehicle 1 comprises adjacent one side 3 at its rear end, a single jib crane 5, incorporating a substantially vertical column, a lower end 7 of which is attached to, and supported from, the vehicle floor 2, and an upper and 6 of which is attached to the vehicle roof 4, a rotatable element mounted on the column and a jib 25 carried by the rotatable element and rotatably supporting a rotary pulley 30 or sprocket for a flexible lifting/lowering element 32 associated with the crane 5, means 31 to displace the flexible lifting/lowering element 32 and/or pulley 30 or sprocket, and the jib 25 being swingable from an inboard, storage position within the vehicle 1 to on outboard, operative position.

While these jacking devices may be suitable for the purposes for which they were designed, they would not be as suitable for the purposes of the present invention, as hereinafter described.

SUMMARY OF THE PRESENT INVENTION

A primary object of the present invention is to provide a trolley hoist for raising and transporting a load.

Another object of the present invention is to provide a trolley hoist having a pair of spaced apart rails providing means for transporting a load.

Yet another object of the present invention is to provide a trolley hoist wherein said rails extend from a stand in cantilevered fashion.

Still yet another object of the present invention is to provide a trolley hoist wherein said rails have a substantially L-shape cross section.

Another object of the present invention is to provide a trolley hoist having a pair of jack-plates.

Yet another object of the present invention is to provide a trolley hoist wherein said jack-plates include a plate having a plurality of throughbores whereby said jack-plates can be fastened to a load.

Still yet another object of the present invention is to provide a trolley hoist wherein said jack-plates incorporate extendable retractable wheels located on opposing plate ends.

Another object of the present invention is to provide a trolley hoist wherein said jack-plates have a screw jack forming an integral part therewith.

Yet another object of the present invention is to provide a trolley hoist wherein said wheels are in communication with said screw jack.

Still yet another object of the present invention is to provide a trolley hoist having a pry bar including a motive member forming an integral part therewith for supporting some part of the load during relocation.

Another object of the present invention is to provide a trolley hoist having a pair of said pry bars with connecting members spaced approximately similar to the track spacing during a relocation task.

Yet another object of the present invention is to provide a trolley hoist optionally incorporating support arms extending between jacks plates as additional support members.

Still yet another object of the present invention is to provide a trolley hoist wherein said support arms are pivotally extending from a jacking plate with the other plate having at least one element of a securing means.

Another object of the present invention is to provide a trolley hoist wherein said spaded apart rails can have roller bearings positioned therebetween.

Additional objects of the present invention will appear as the description proceeds.

The present invention overcomes the shortcomings of the prior art by providing a hoist trolley having means for elevating a load and means for transporting the load. Means for elevating the load comprises a pair of jacking plates having apertures passing through it providing means for attaching the plates to the load. Fixed to the opposing ends of the jack-plates are telescopic legs with extendable retractable wheels. In addition, the jacking element is incorporated therein comprising a screw jack that is used to elevate the load, once the plates are attached, enabling the wheels to be extended. Once extended, the jack base plate is raised with the wheels supporting the load. Transporting the load is accomplished by providing a pair of rails cantilevered from a stand.

The present invention also provides for additional elements to enhance the range of applications for the compressor trolley. Depicted within the illustrations is a pry bar incorporating a motive member whereby the bar can be used in the similar function of supporting some part of the load while moving to a workspace. Another illustration depicts a depending pivot arm having one element of a fastening means, with the other incorporated into an opposing jacking plate. Furthermore, the spaced apart trolley rails can include rollers spaced therebetween.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

Figure 1:
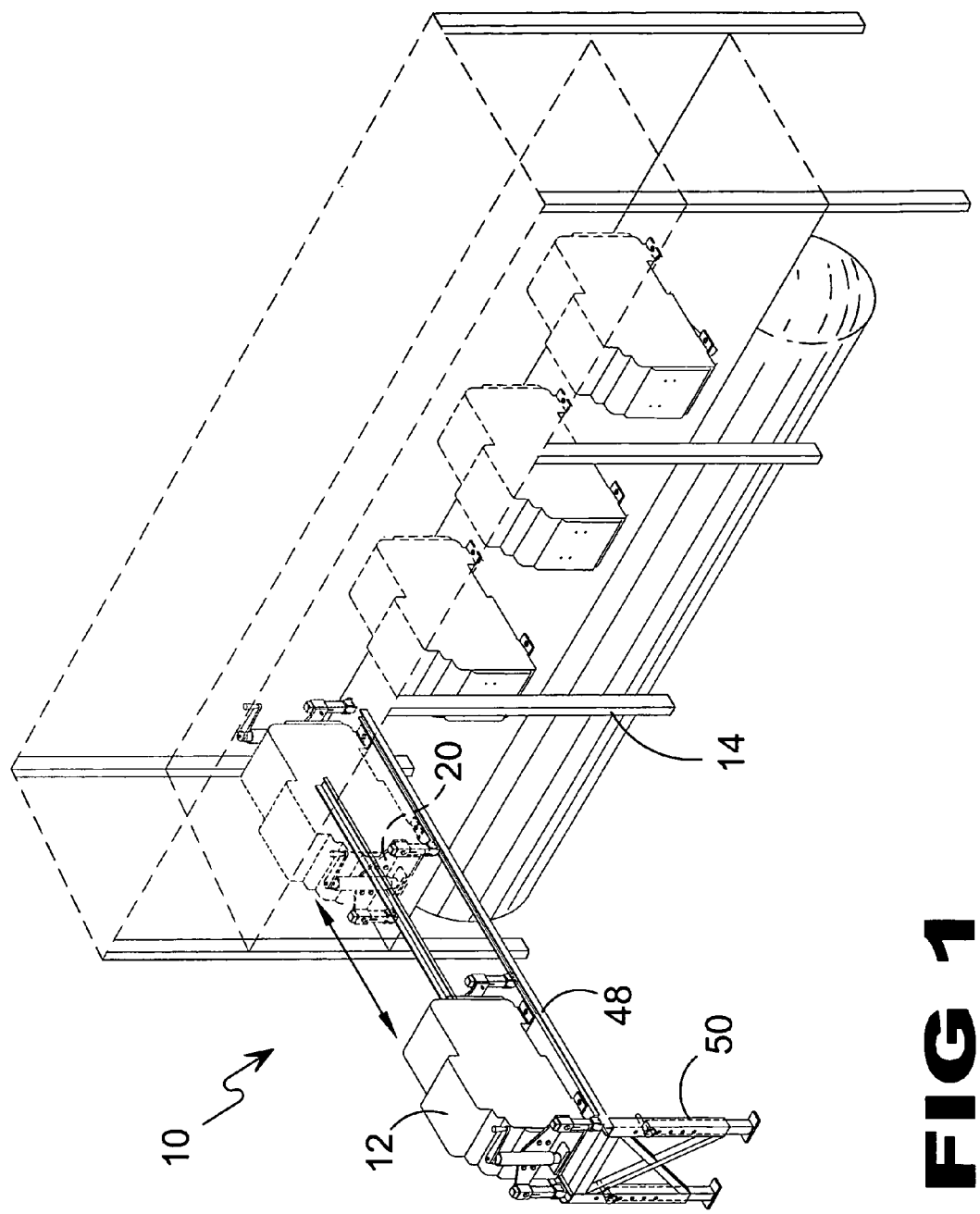
FIG. 1 is an illustrative view of the present invention in use.

DESCRIPTION OF REFERENCED NUMERALS 10 hoist
12 load
14 load support
16 load anchors
18 load common holes
20 jacking apparatus
22 crank
24 crank receiver
26 jack post
28 worm gear jack
30 jack base
32 jack plate
34 jack plate apertures
36 jack plate sleeve
38 jack plate sleeve aperture
40 extendible leg
42 extendible leg caster
44 extendible leg aperture
46 locking pin
48 rails
50 rails adjustable support
52 support extendible leg
54 locking pin aperture
56 locking pin
58 overhead frame
60 chain fall
62 pry bar
64 shaft
66 handle
68 prying tip
70 wheels
72 rollers
74 jack
76 jack arm
78 bracket
80 bracket aperture
82 locking pin
84 adjustable leg bore

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Referring to FIG. 1, shown is an illustrative view of the compressor trolley of the present invention. The compressor trolley 10 is design to remove a load 12, such as compressor 12, from a confined space 14 to a position providing access to the compressor's exterior surfaces and in some instances to replace the defective compressor 12. The compressor trolley comprises jacking plates 20 that are fastened to the compressor 12 so that it can be raised sufficiently to lower the extendable legs having casters thereon, which engage rails 48 having an end positioned support 50 allowing the compressor 12 to be moved from the compressor rack 14 to a more advantageous workplace.

Figure 2:
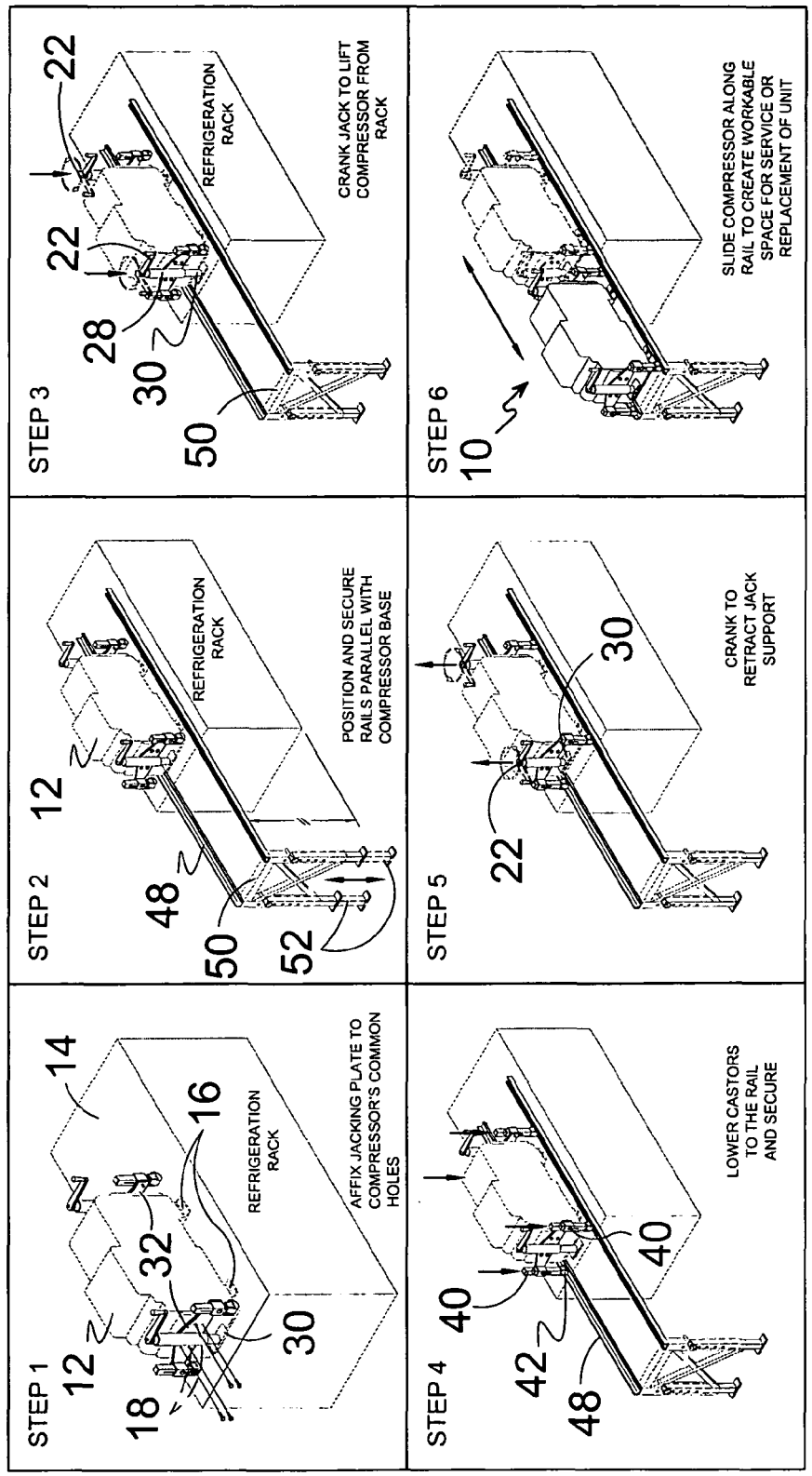
FIG. 2 is an illustrative view of the present invention's order of operations.

Referring to FIG. 2, shown are the operative steps employed in utilizing the present invention. In the preferred embodiment of the present invention, load 12 is depicted as a compressor but the utility of the compressor trolley 10 can be used in other areas where a load 12 having only inches within a support frame need to be removed therefrom. In step one, the compressor trolley 10 uses one or more jacking plates 20 that are releasably attached to compressor 12 using fasteners positioned within apertures 18 of plate 32 and fastened to the compressor common holes 18. In step two, rails 48 are positioned under the compressor and using rails support 50 having extendible legs 52 are adjusted parallel with the compressor's base. In step three, the compressor is raised by extending jack base 30 of worm gear jack 28 using crank handle 22 to an appropriate height. As illustrated in step four, once raised to the appropriate height extendible legs 40 having casters 42 are lowered into engagement with rails 48 and secured using locking pins 46. In step five, using crank 22 jack base 30 is raised until the compressor is supported by the extendible legs having castors 42 in engagement with rails 48. In step six, shown is the compressor moved to a position along rails 48 to a desired workable location for service or replacement of the unit.

Figure 3:
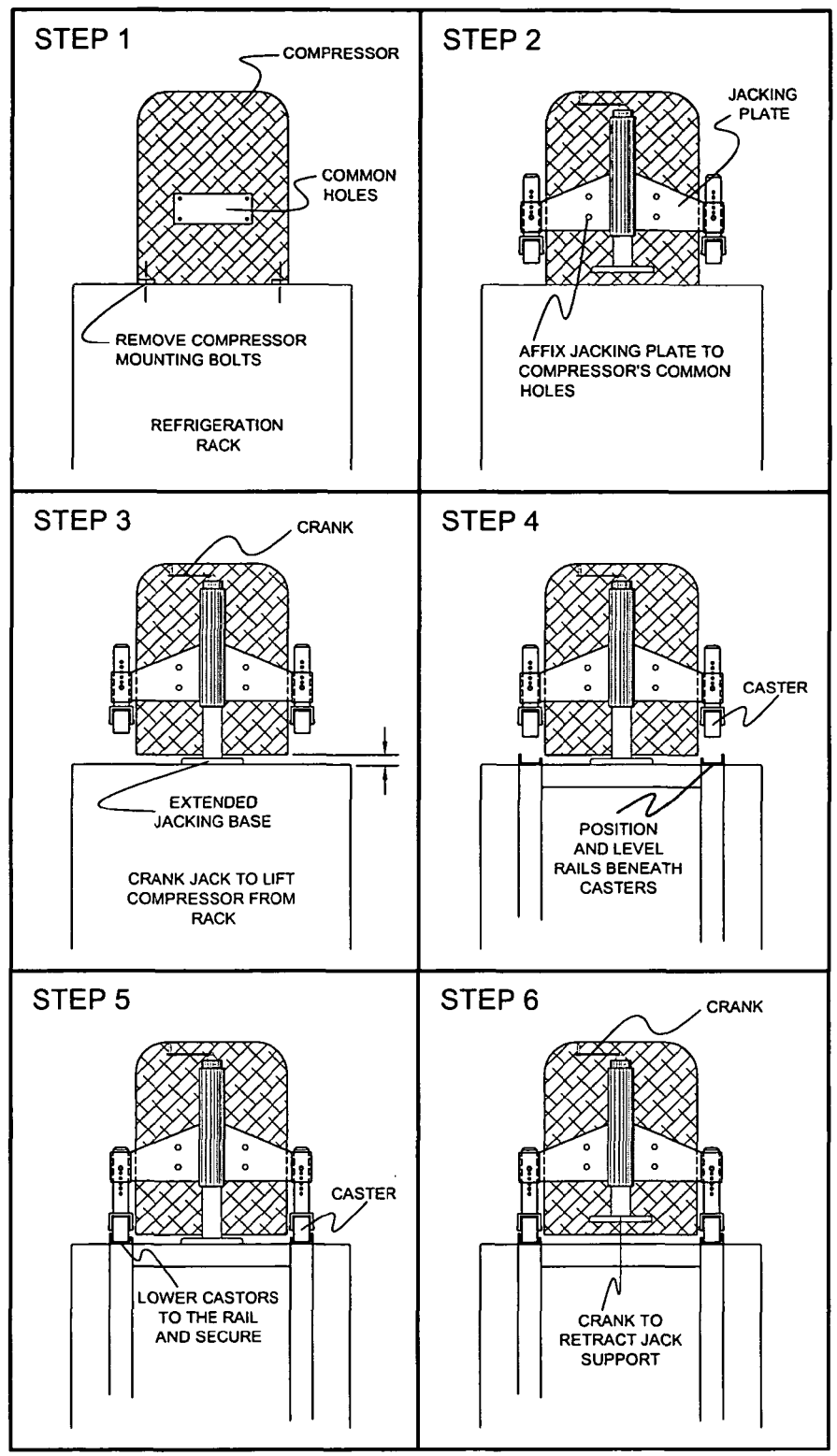
FIG. 3 is an end view of the present invention's order of operations.

Referring to FIG. 3, shown is another illustration of the order of operation in the attachment and raising of the compressor. In step one, the compressor mounting bolts are removed. Shown in step two, the jacking apparatus is secured to the compressor using the compressor common bolt holes. In step three, the compressor is raised to the appropriate height for positioning of the rails. Shown in step four the rails are positioned under the casters and leveled. Shown in step 5, the casters of the extendible legs are lowered into engagement with the rails, where as shown in step six the base of the jack is raised until the compressor is supported on the casters.

Figure 4:
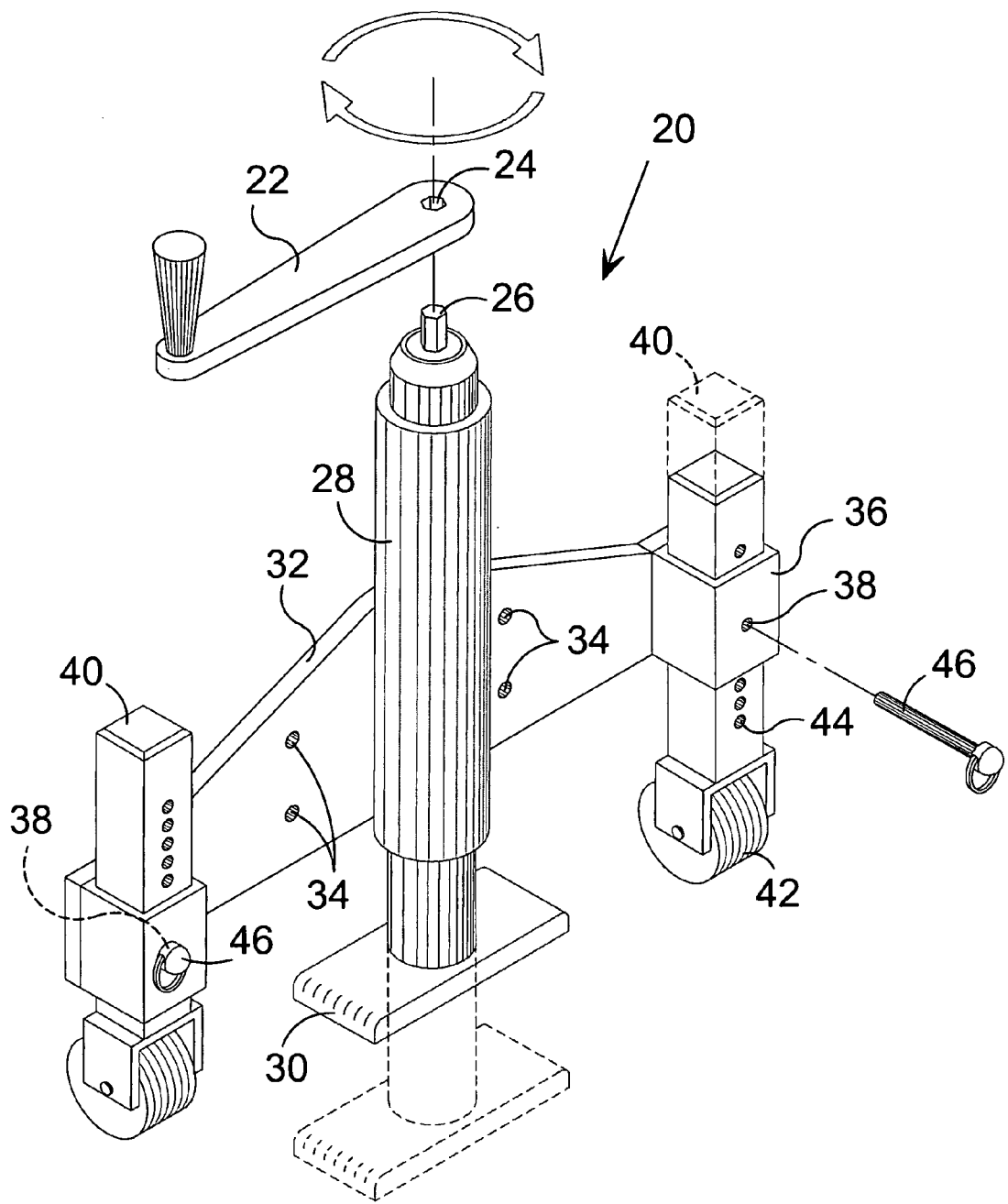
FIG. 4 is an isometric view of the present invention's jacking mechanism.

Referring to FIG. 4, shown in the jacking apparatus of the present invention. The jacking apparatus 20 is comprised of worm gear jack 28 having extendible jacking base 30 and jack post 26 for attachment of crank 22 using crank receiver 24. The worm gear jack 28 is fixed to jack plate 32 having jack plate apertures 34 whereby jacking plate 32 can be releasably fastened to a load. Positioned on each end of jacking plate 32 are jack plate sleeves 36 with bore 38 passing therethrough. Sleeve 36 forms housing for extendible legs 40 having a plurality of leg apertures 44, which when aligned with sleeve aperture 38 provides for insertion of locking pin 46. Extendible legs 40 incorporate caster wheels 42 so that when extended means is provided for transporting a load 12 to a desired location.

Figure 5:
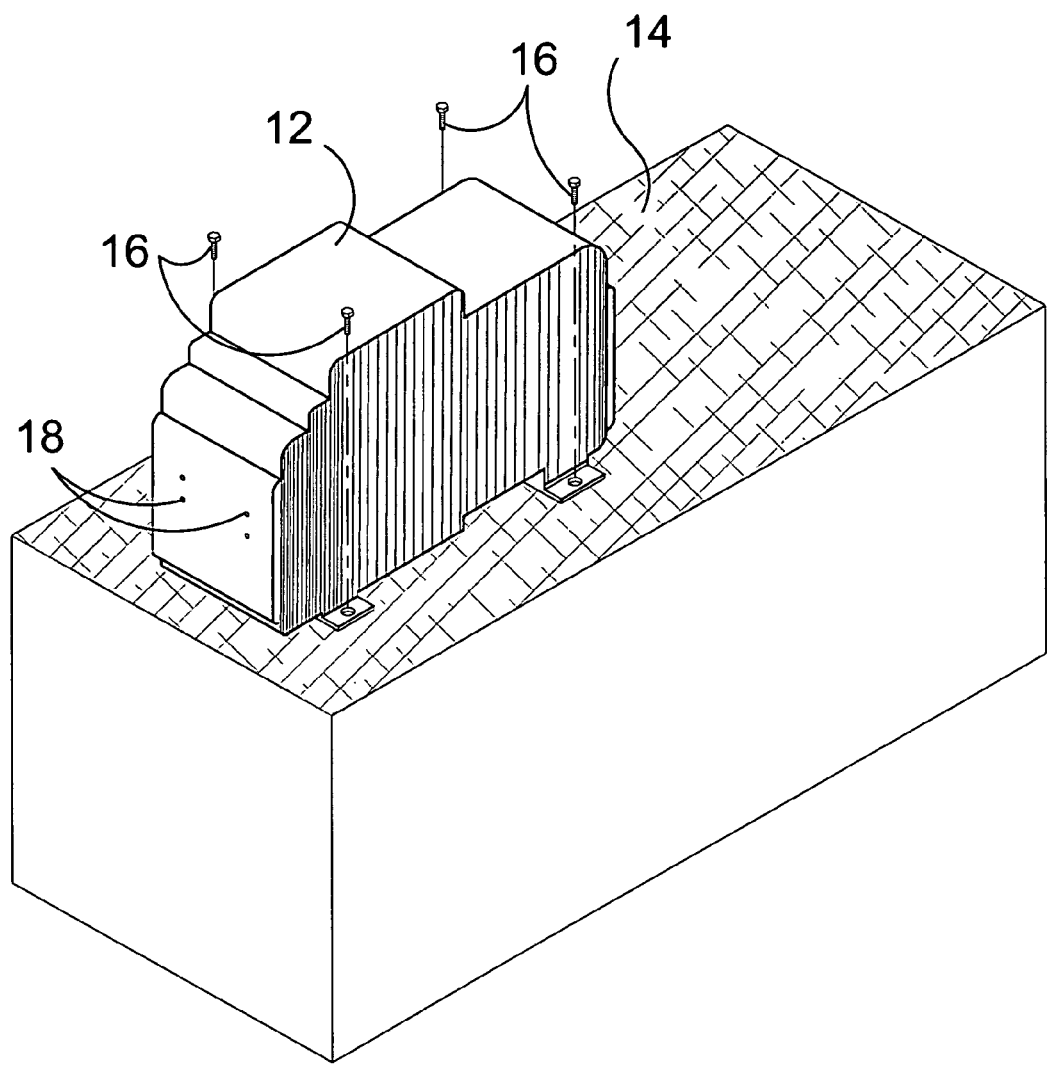
FIG. 5 is an isometric view of the present invention's first order of operation.

Referring to FIG. 5, shown is an isometric view of a compressor mounted to a rack. As aforementioned, the compressor trolley 10 is design to remove a load, such as compressor 12, from a confined space, such as refrigeration rack 14. For clarity purposes the illustration of the confined space is limited to FIG. 1. To allow free movement of the compressor, the user removes all mounting hardware 16 that secures the compressor 12 to refrigeration rack 14 and attaches the jacking apparatus 20 to the compressor common bolt holes 18.

Figure 6:
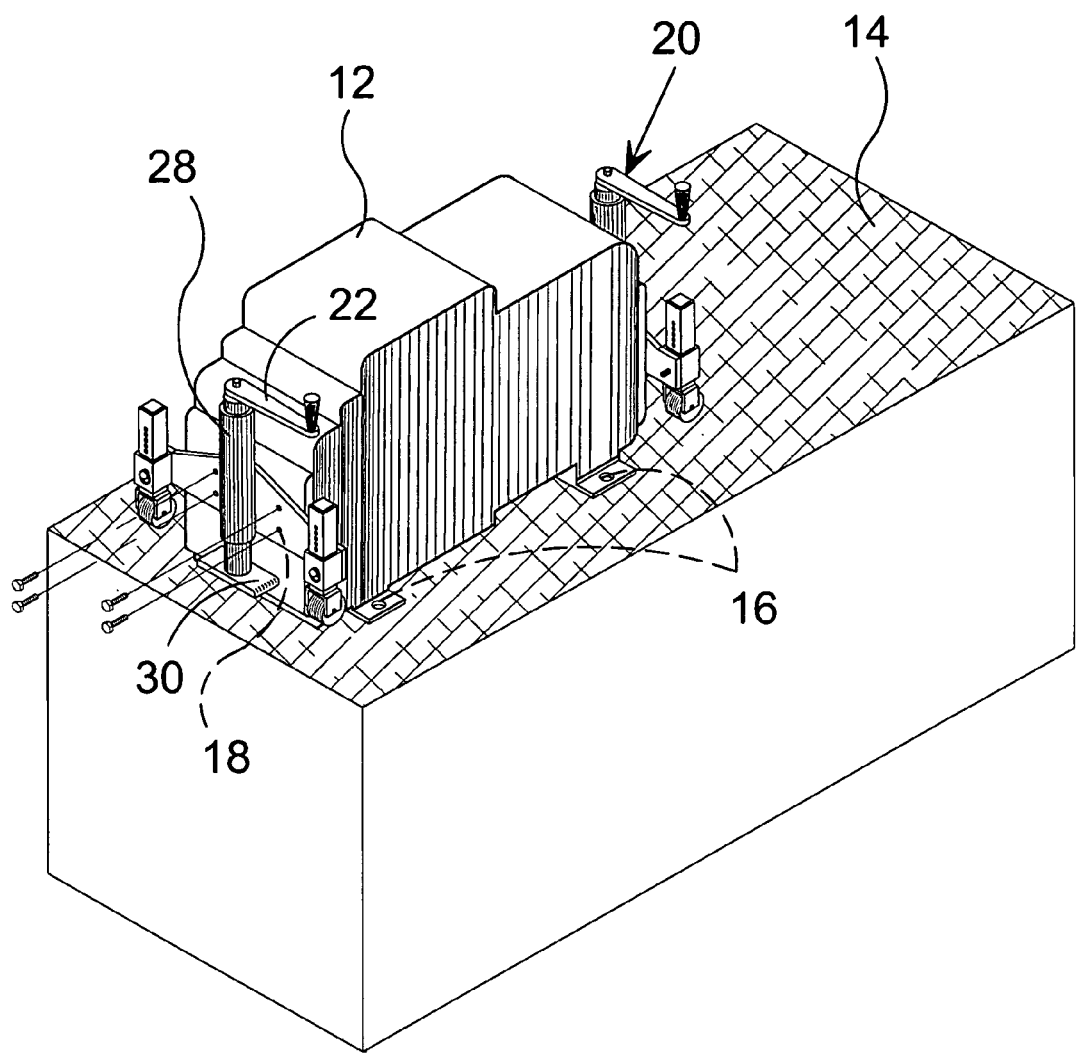
FIG. 6 is an isometric view of the present invention's second order of operation.

Referring to FIG. 6, shown is an isometric view of the compressor trolley system of operation shown as step one in FIG. 2. In step one, the compressor trolley 10 uses one or more jacking plates 20 that are releasably attached to compressor 12 using fasteners positioned within apertures 34 of plate 32 and fastened to the compressor common holes 18.

Figure 7:
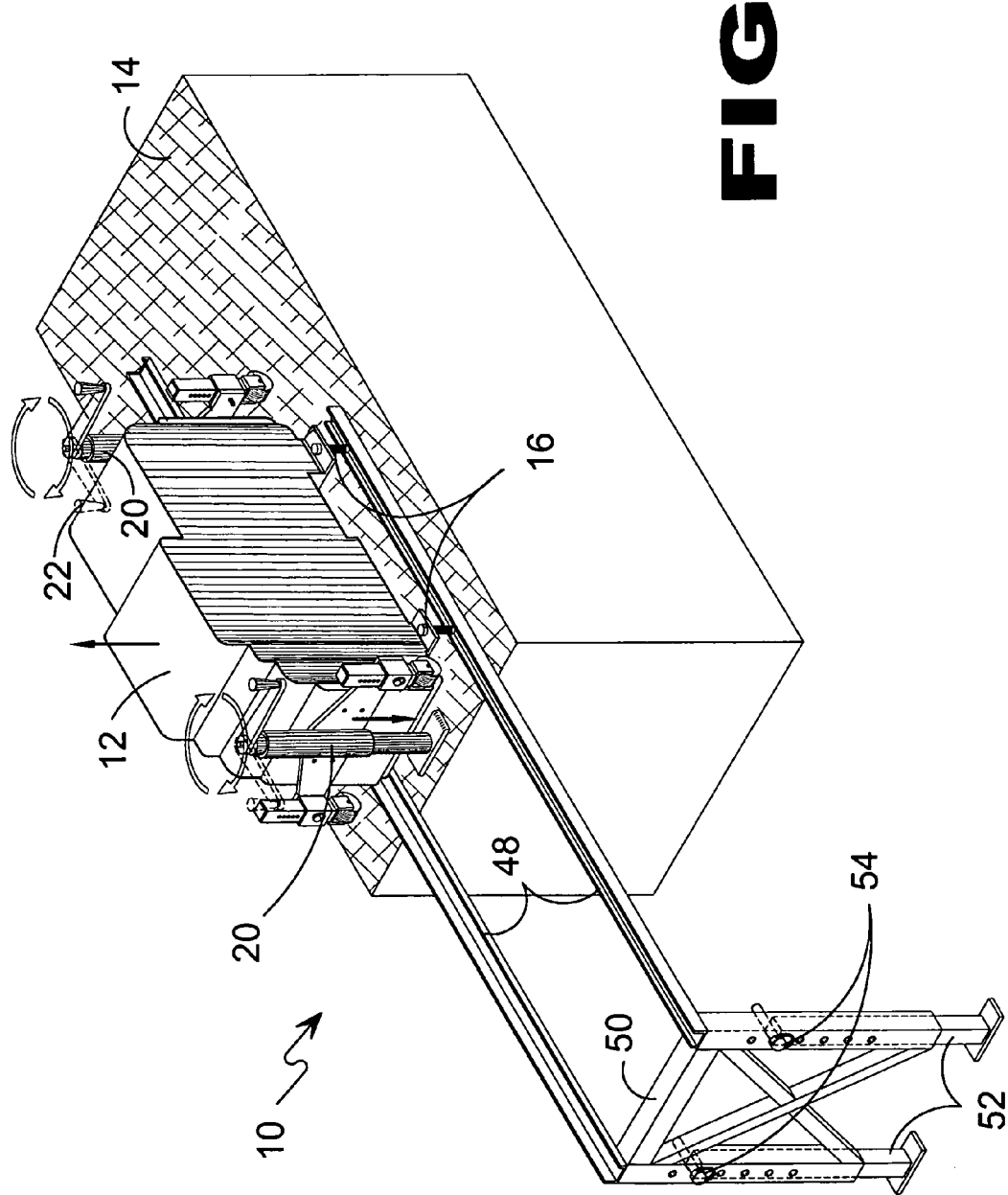
FIG. 7 is an isometric view of the present invention's third order of operation.

Referring to FIG. 7, shown is an isometric view of the compressor trolley system of operation shown as step two in FIG. 2. In step two, rails 48 are positioned under the compressor and using rails support 50 having extendible legs 52 are adjusted parallel with the compressor's base.

Figure 8:
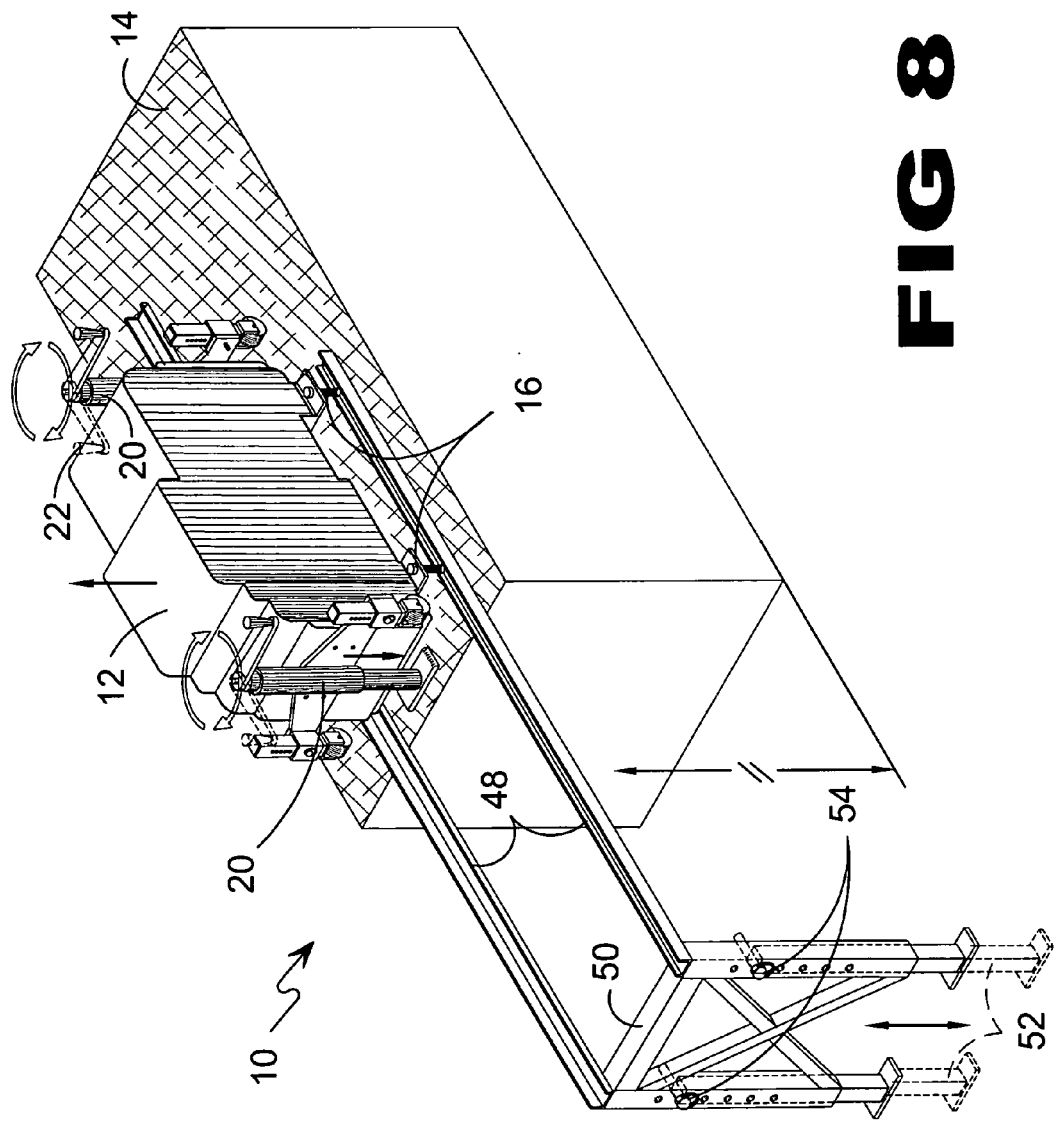
FIG. 8 is an isometric view of the present invention's fourth order of operation.

Referring to FIG. 8, shown is an isometric view of the compressor trolley system of operation shown as step three in FIG. 2. In step three, the compressor is raised by extending jack base 30 of worm gear jack 28 using crank handle 22 to an appropriate height.

Figure 9:
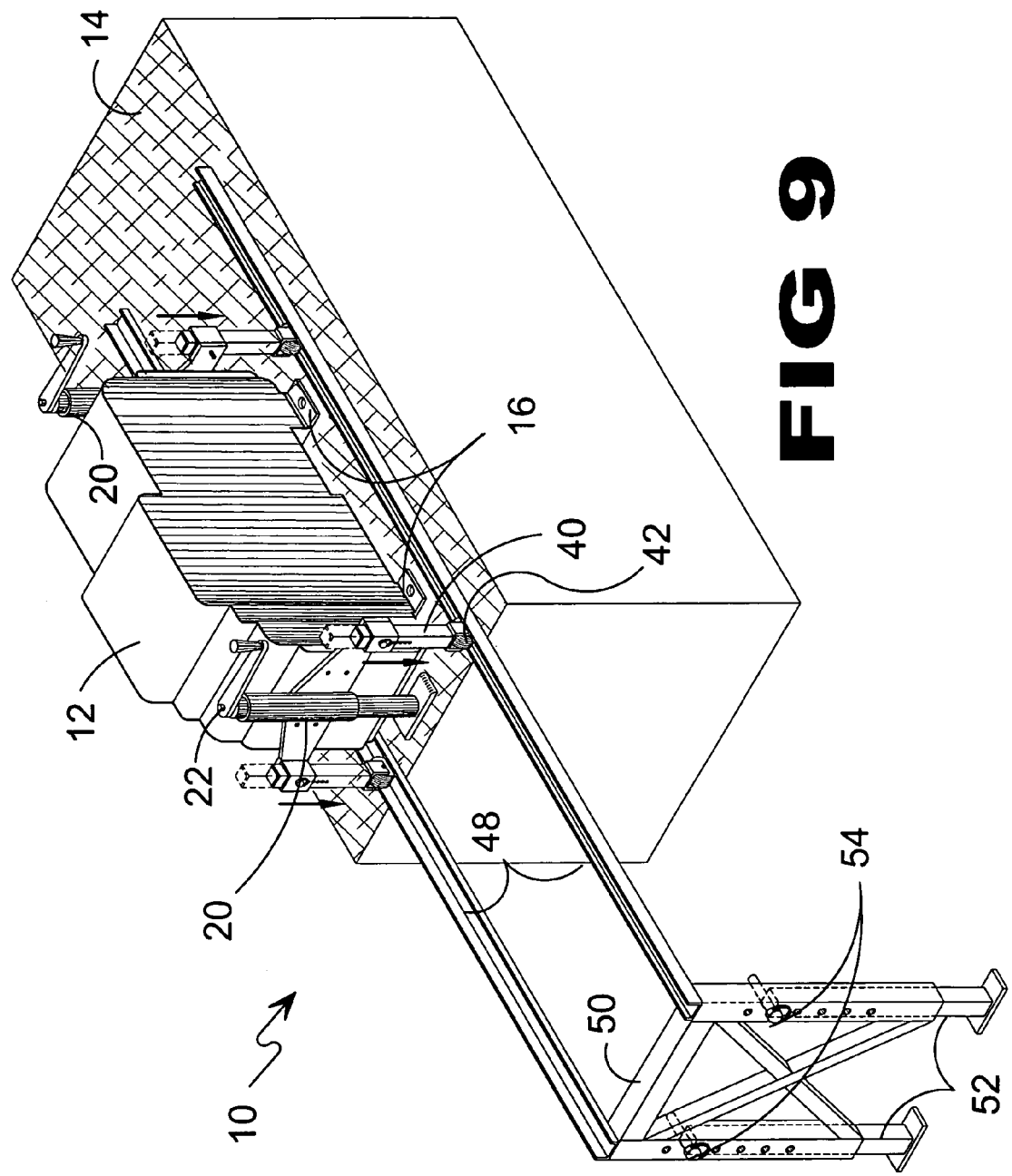
FIG. 9 is an isometric view of the present invention's fifth order of operation.

Referring to FIG. 9, shown is an isometric view of the compressor trolley system of operation shown as step four in FIG. 2. As illustrated in step four, once raised to the appropriate height extendible legs 40 having casters 42 are lowered into engagement with rails 48 and secured using locking pins 46.

Figure 10:
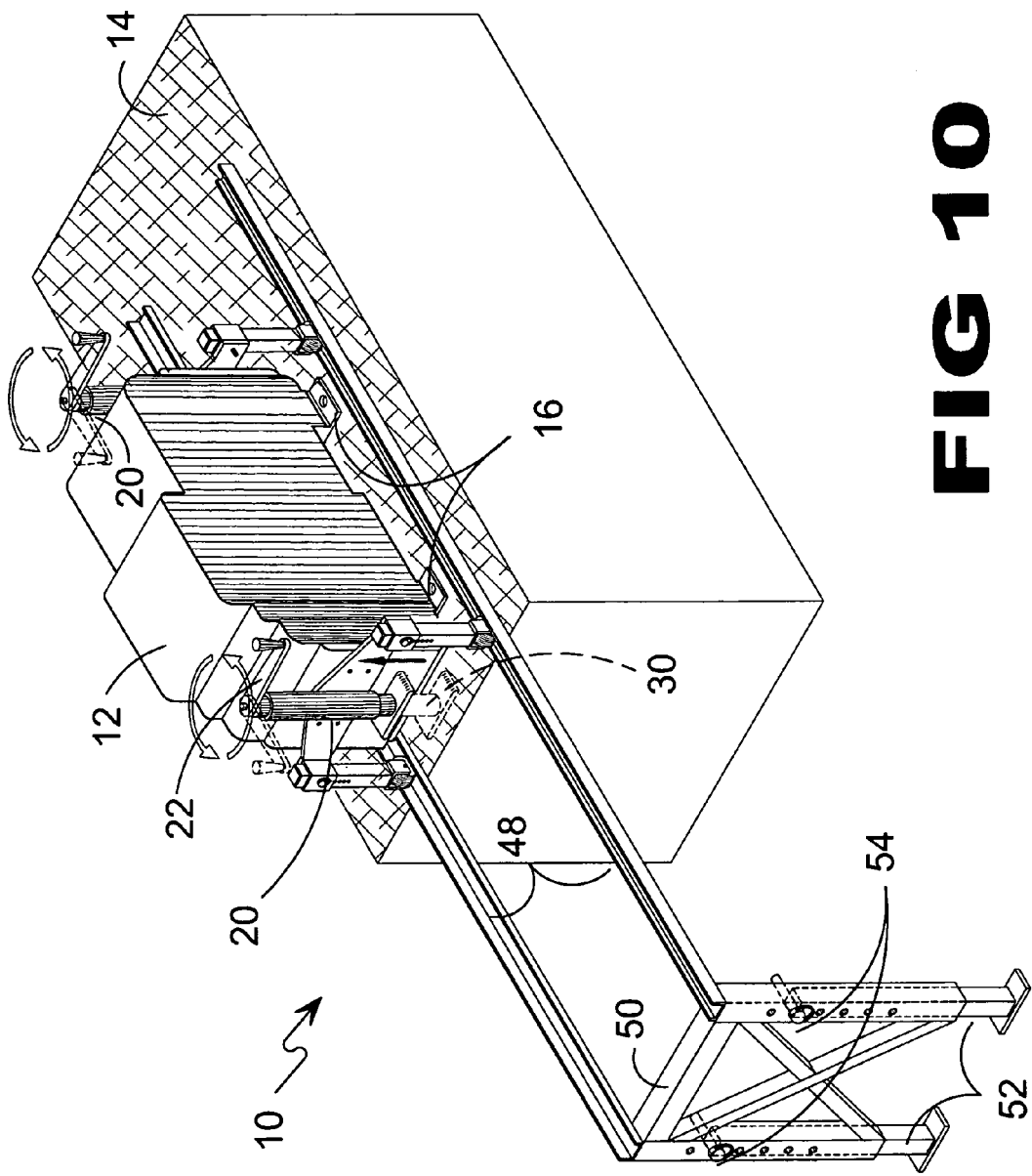
FIG. 10 is an isometric view of the present invention's sixth order of operation.

Referring to FIG. 10, shown is an isometric view of the compressor trolley system of operation shown as step five in FIG. 2. In step five, using crank 22 jack base 30 is raised until the compressor is supported by the extendible legs having castors 42 in engagement with rails 48.

Figure 11:
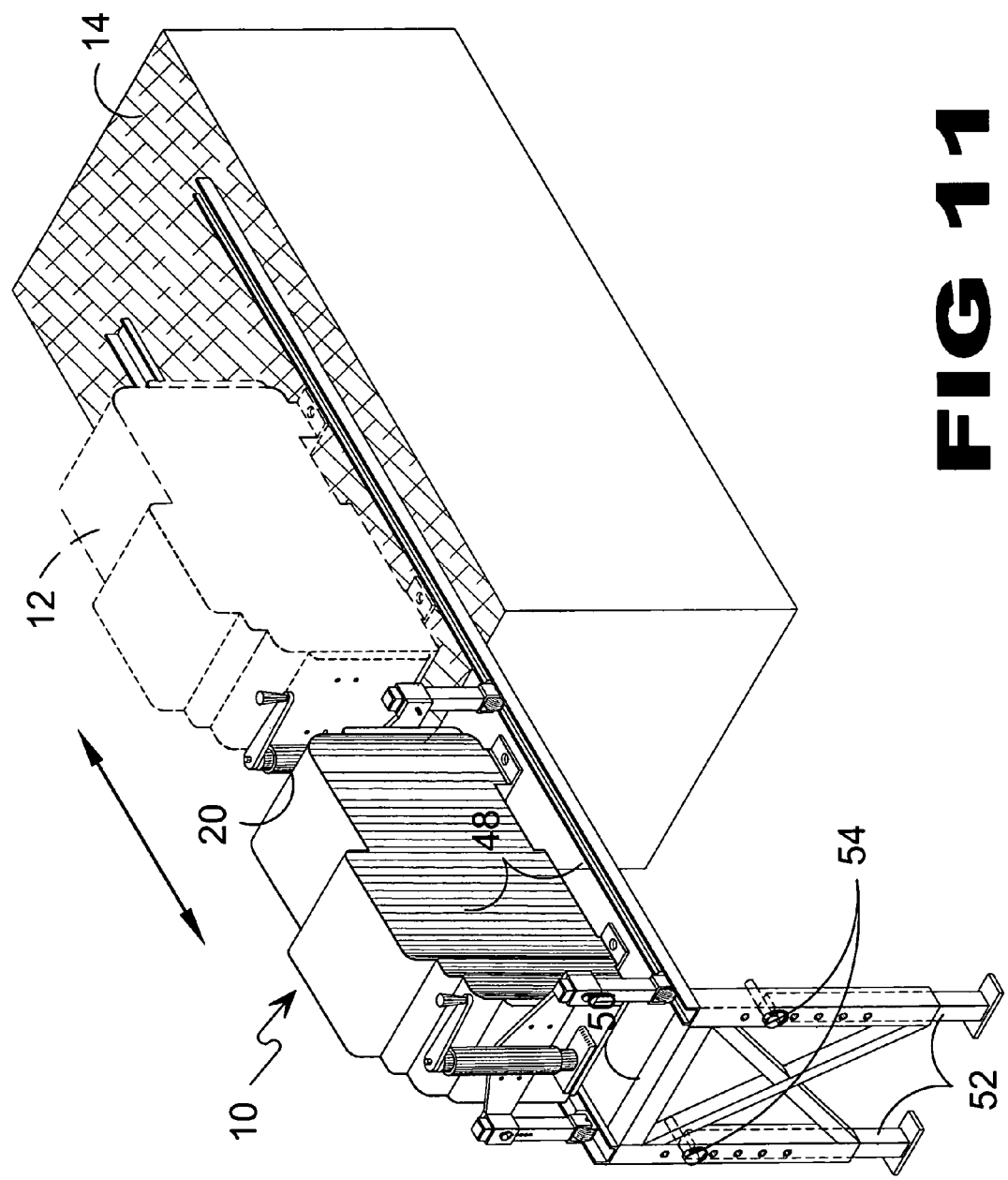
FIG. 11 is an isometric view of the present invention in use.

Referring to FIG. 11, shown is an isometric view of the compressor trolley system of operation shown as step six in FIG. 2. In step six, shown is the compressor moved to a position along rails 48 to a desired workable location for service or replacement of the unit. By moving the compressor to an open area along the trolley, the user is provided means to work more safely and efficiently. The present invention provides compressor trolley 10 with one or more jacking plates 20 that are releasably attached to compressor 12 using fasteners positioned within apertures 18 of plate 32 and fastened to the compressor common holes 18. Rails 48 are positioned under the compressor and using extendible legs 52 of rails support 50 are adjusted parallel with the compressor's base. The compressor is raised by extending jack base 30 of worm gear jack 28 using crank handle 22 to an appropriate height whereupon extendible legs 40 having casters 42 are lowered into engagement with rails 48 and secured using locking pins 46. Crank 22 is used to raise jack base 30 until the compressor is supported by extendible legs 40 having castors 42 in engagement with rails 48 so that compressor can be moved along rails 48 to a desired workable location for service or replacement of the unit.

Figure 12:
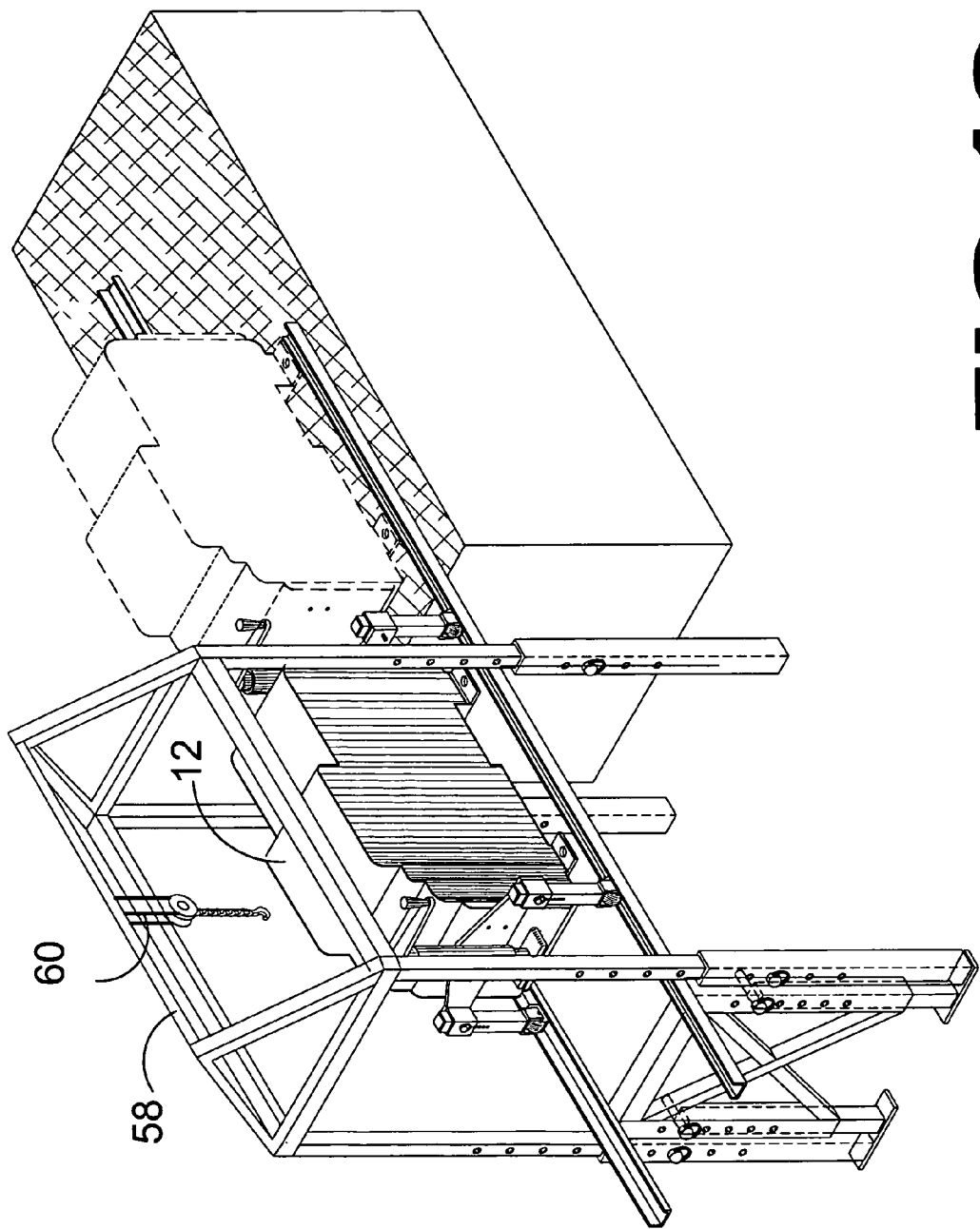
FIG. 12 is an illustrative view of the present invention's hoist system.

Referring to FIG. 12, shown is an additional element of the compressor trolley comprising a gantry for lowering a compressor and raising a replacement compressor. The gantry 58 is comprised of four extendible retractable legs with top most supports extending therebetween. A beam supported by an A-frame runs between and co-parallel with the rails 48 having a chain fall 60 depending therefrom. The gantry 58 provides the user means to place or remove a compressor 12 to and from the rails 48 utilizing a second pair of stanchions fastened to the rails so that once the jacking plates 20 are removed the compressor can be lowered. Once the replacement compressor 12 is raised between the rails 48 the jacking plate apparatus 20 are reattached and the compressor is moved back into position. The complete trolley system allows for improved efficiency and safety of compressor installation and maintenance.

Figure 13:
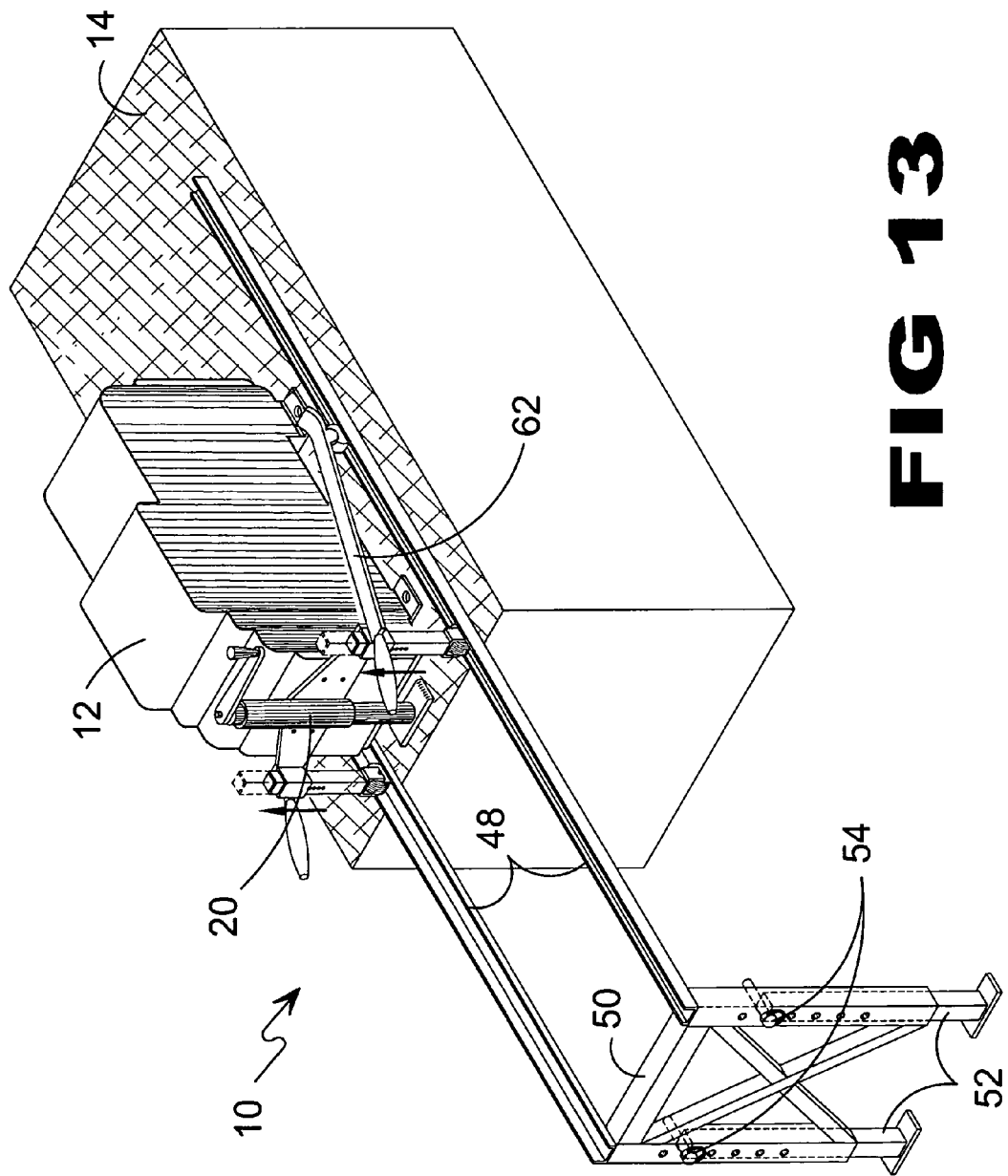
FIG. 13 is an isometric view of an additional element of the present invention.

Referring to FIG. 13, shown is an isometric view of another additional element of the present invention comprising a rolling pry bar used to raise the compressor's rear portion. In some instances there is insufficient room for the rear jacking apparatus 20 to be fixed to the rear of the compressor 12. Therefore, the present invention provides a wheeled pry bar 62. In operation, the compressor mounting bolts are removed and the front jacking apparatus 20 is secured to the compressor using the compressor common bolt holes. The compressor is raised and the rails 48 are positioned under the casters and leveled. The extendible legs are lowered into engagement with the rails and the jack base is raised until the front end of the compressor is supported on the casters. Now placing the wheels of the pry bar into the rails, the pry bar tip is used to elevate the back end of the compressor so that it can be rolled out to a desired position.

Figure 14:
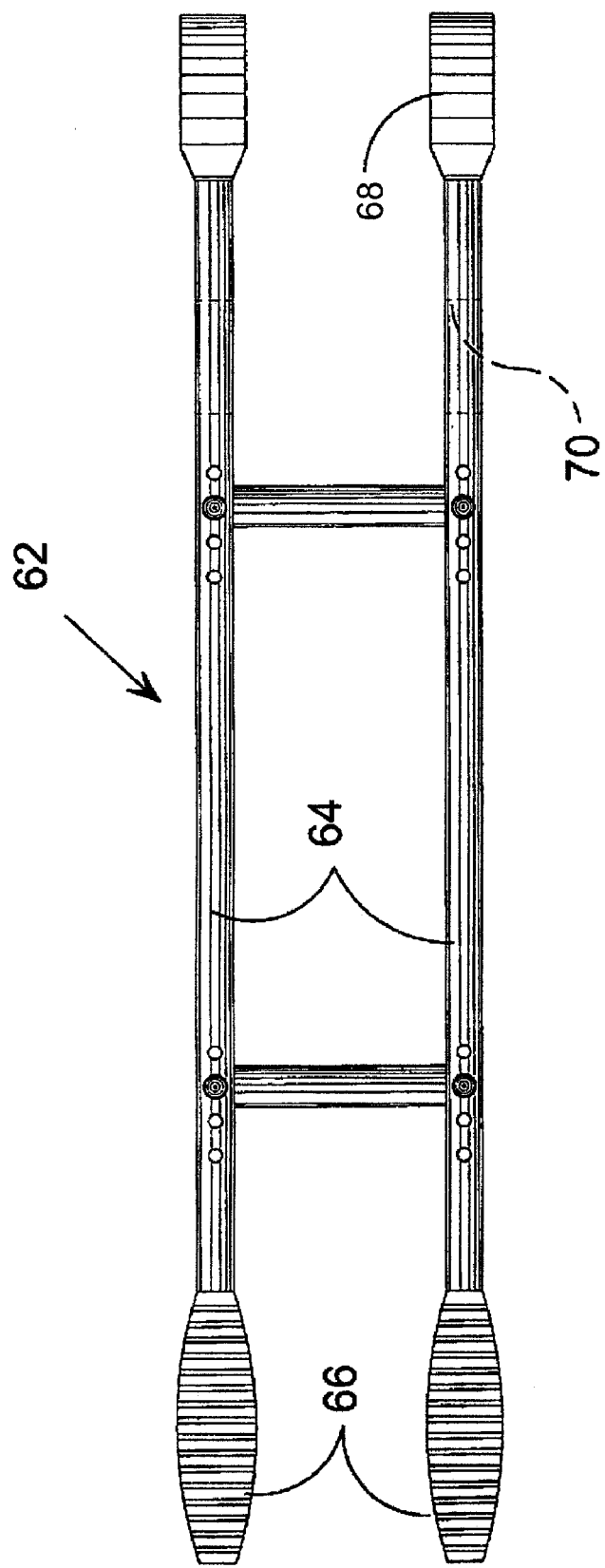
FIG. 14 is a top view of an additional element of the present invention.

Referring to FIG. 14, shown is a top view of the rolling pry bar. Providing an alternate means of raising the rear of a compressor, the rolling pry bar 62 comprises shaft 64 with handles 66 at one end and prying tip 68 at the other end with wheels 70 therebetween.

Figure 15:
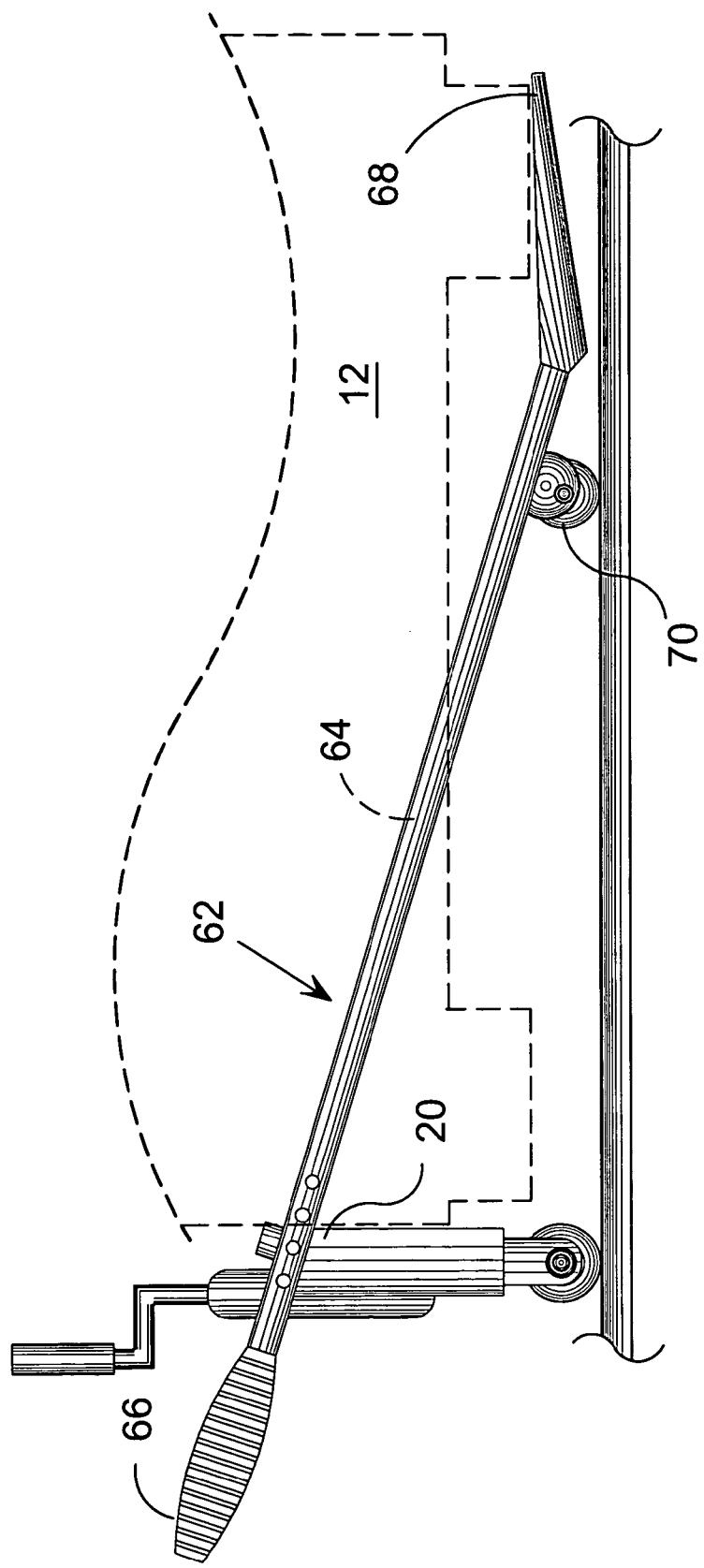
FIG. 15 is a side view of an additional element of the present invention.

Referring to FIG. 15, shown is a side view of the pry bar additional element of the present invention. The present invention provides an alternate means for raising the back end of a compressor when there is insufficient room to utilize jacking apparatus 20. As illustrated, the compressor mounting bolts are removed and the front jacking apparatus 20 is secured to the compressor using the compressor common bolt holes. The compressor is raised and the rails 48 are positioned under the casters and leveled. The extendible legs are lowered into engagement with the rails and the jack base is raised until the front end of the compressor is supported on the casters. Placing the wheels 70 of pry bar 62 into rails 48, the pry bar tip 68 is used to elevate the back end of the compressor 12 so that it can be rolled out to a desired position using pry bar handles 66.

Figure 16:
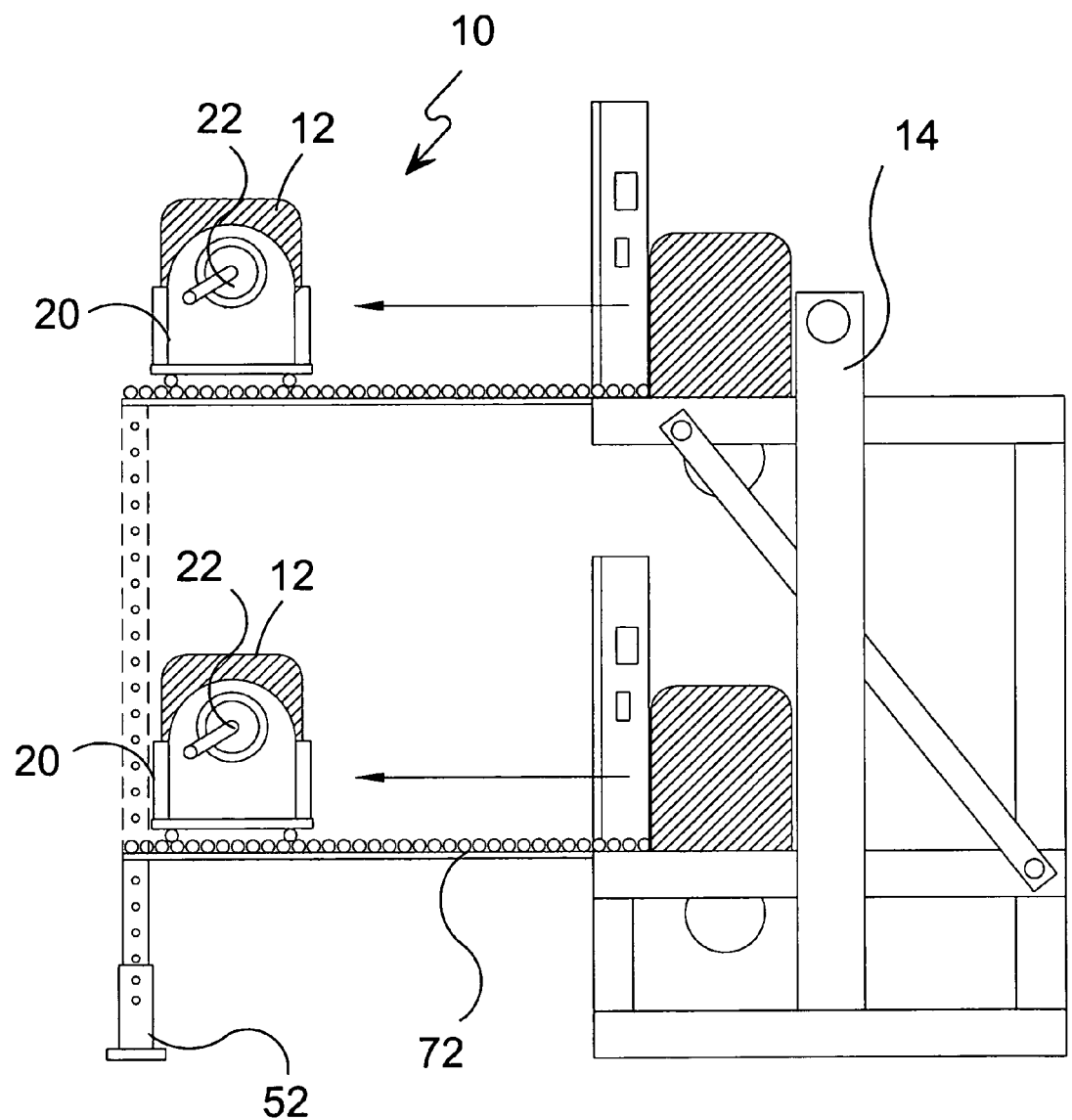
FIG. 16 is a side view of an additional element of the present invention.

Referring to FIG. 16, shown is another additional element of the present invention comprising a series of rollers 72 that are especially suited for the removal of a compressor in a sideways means to allow for the removal of the compressor without hindrance from existing structure local to the compressor queued for removal.

Figure 17:
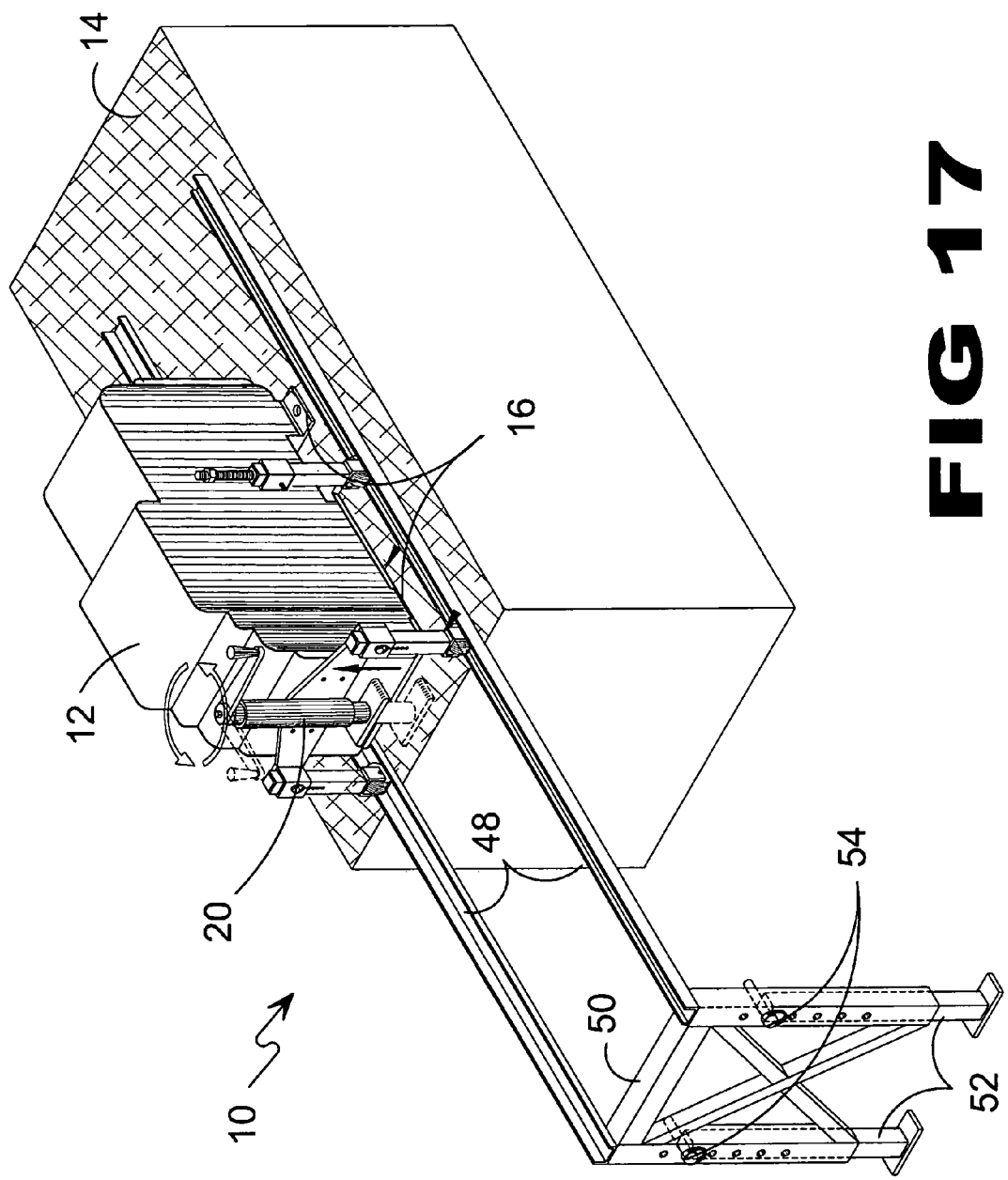
FIG. 17 is an isometric view of an additional element of the present invention.

Referring to FIG. 17, shown is an isometric view of another additional element of the present invention in the form of an alternate jacking apparatus 74. With each of the caster supports extended into the rails, the jack cylinder is retracted by rotating the crank. When the jack base is raised above the compressor mounting surface, the load is transferred to the casters. In turn, the compressor is free to travel the length of the rails.

Figure 18:
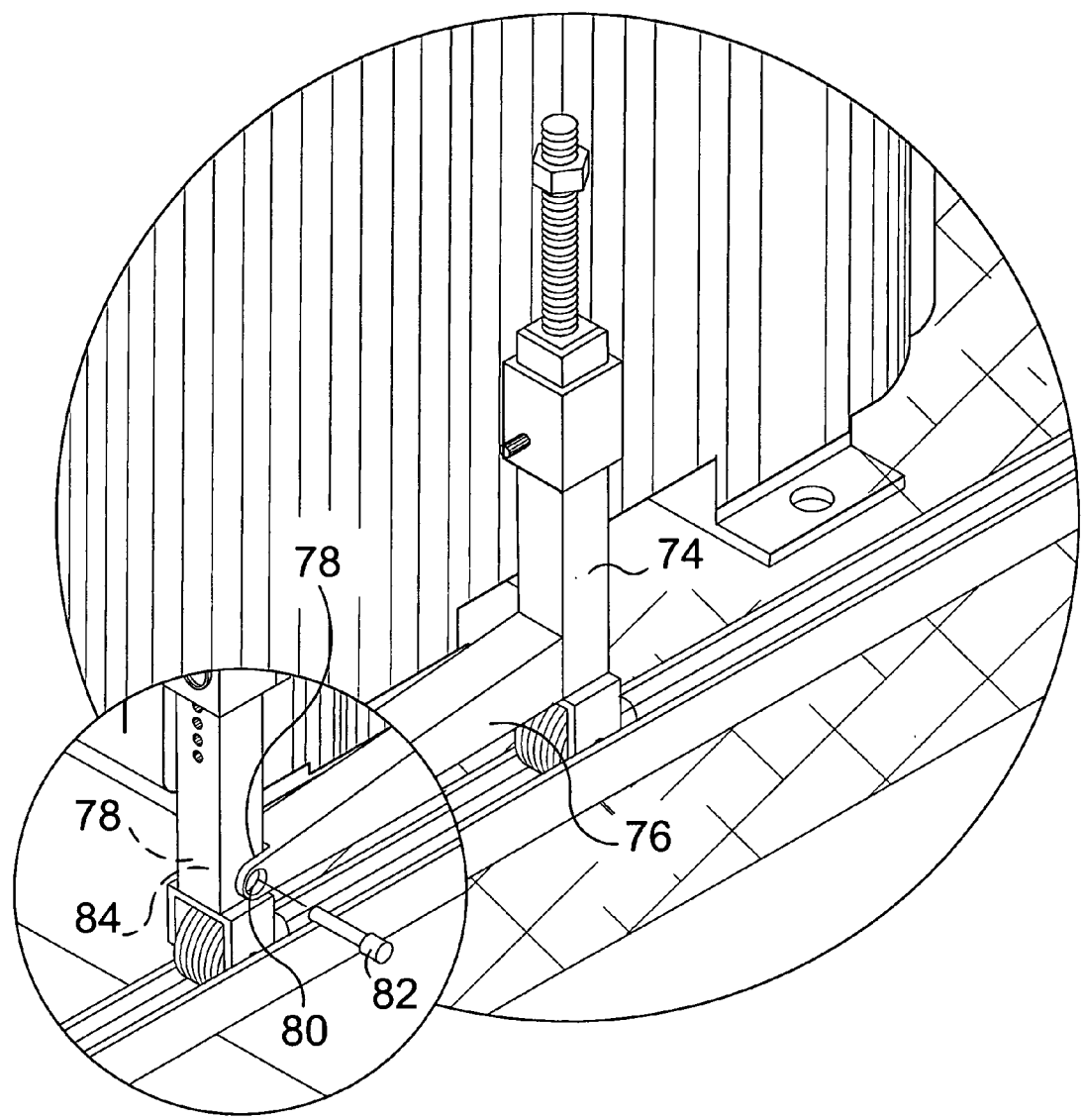
FIG. 18 is a detailed isometric view of an additional element of the present invention.

Referring to FIG. 18, shown is an enlarged isometric view of an additional element of the jacking apparatus of the present invention. An alternate jacking apparatus is provided that extends under the back end of the compressor and uses a similar worm gear jack 74 to raise and lower the compressor support. Extending from jack 74 is arm 76 terminating in bracket 78 having bracket aperture 80. Bracket 78 straddles the front extendible leg having throughbore 84 with locking pin 82 extending through aperture 80 and bore 84 providing a swivel/pivot joint to connect the adjustable caster 74.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A compressor trolley for moving a compressor to a workplace comprising:
a jacking apparatus for moving the compressor, said jacking apparatus having a vertically orientated jack plate with substantially planar front and rear faces, said jack plate having a plurality of apertures for securing said front face of said jack plate to the compressor, said jack plate having a pair of sleeves directly attached thereto on opposing ends thereof, each said sleeve having an aperture, each said sleeve having an extendible leg disposed therein, each said extendible leg having a caster on a bottom end thereof, each extendible leg have a plurality of apertures therein for receiving a locking pin to secure the extendible leg in a vertical position with respect to its respective sleeve, a jack secured to said rear face of said jack plate intermediate said sleeves for raising the compressor when said front face of the jack plate is secured to the compressor, said compressor trolley further comprising a pair of rails positionable under opposing sides of the compressor for supporting the casters of each jacking apparatus, an adjustable rail support for supporting the rails, and a gantry fastenable to the rail support having a beam with a chain fall depending therefrom whereby said compressor can be suspended between said rails.

2. The compressor trolley of claim 1, wherein the sleeves are secured to the rear face of said jack plate.

3. The compressor trolley of claim 1, wherein the plurality of said apertures includes a plurality of apertures disposed in said jack plate on each side of said jack.

4. The compressor trolley of claim 1, wherein the jack plate has a height extending in the direction of a length of the extendible legs, the height of said jack plate is greatest in a center of said plate and smallest at the ends of said plate.

5. The compressor trolley in claim 1, further comprising a pair of jacking apparatus, where one jacking apparatus is for securing to a front of the compressor and the other is for securing to a back of the compressor.

6. The compressor trolley as recited in claim 5, wherein said pair of jacking apparatus is comprised of one of said jacking apparatus for securing to a front of the compressor and a wheeled pry bar to elevate the rear of the compressor.

7. The compressor trolley as recited in claim 5, wherein said pair of jacking apparatus is comprised a first jacking apparatus for securing to a front of the compressor and a worm gear jack having a depending arm pivotally fastened to one of said extendible legs of said first jacking apparatus.

* * * * *